US008825304B2

(12) United States Patent
Horvitz et al.

(10) Patent No.: US 8,825,304 B2
(45) Date of Patent: Sep. 2, 2014

(54) MEDIATION OF TASKS BASED ON ASSESSMENTS OF COMPETING COGNITIVE LOADS AND NEEDS

(75) Inventors: Eric Horvitz, Kirkland, WA (US); Shamsi Tamara Iqbal, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 529 days.

(21) Appl. No.: 12/827,037

(22) Filed: Jun. 30, 2010

(65) Prior Publication Data

US 2012/0004802 A1    Jan. 5, 2012

(51) Int. Cl.
*B60R 22/00* (2006.01)
*E05F 15/00* (2006.01)
*G05D 1/00* (2006.01)
*G05D 3/00* (2006.01)
*G06F 17/00* (2006.01)

(52) U.S. Cl.
USPC ............... 701/45; 701/29.1; 701/1; 180/271

(58) Field of Classification Search
CPC ....... G06Q 40/00; G06Q 10/00; G06Q 30/00; G06Q 50/00; G06F 19/00; G06F 3/01; G06F 15/02; G06F 15/20; G06F 1/00; G06D 1/00
USPC ............ 701/1, 23, 29, 36, 45, 469, 300, 301, 701/70, 29.1; 705/10, 7.12, 4; 340/439, 340/903, 425, 540, 575, 573.1, 576, 435; 600/300, 554; 235/386; 702/19, 182; 455/345; 307/10.1; 382/154, 103, 107; 180/271
See application file for complete search history.

(56) References Cited

U.S. PATENT DOCUMENTS

| 6,349,246 | B1 * | 2/2002 | Smith et al. ............... 701/1 |
| 6,393,348 | B1 * | 5/2002 | Ziegler et al. ............ 701/45 |
| 6,496,724 | B1 * | 12/2002 | Levendowski et al. ...... 600/544 |
| 6,580,973 | B2 * | 6/2003 | Leivian et al. ............ 701/1 |
| 6,625,485 | B2 * | 9/2003 | Levendowski et al. ...... 600/544 |
| 6,632,174 | B1 * | 10/2003 | Breznitz ................. 600/300 |
| 6,946,966 | B2 | 9/2005 | Koenig |

(Continued)

OTHER PUBLICATIONS

Lamble, et al., "Cognitive Load and Detection Thresholds in Car Following Situations: Safety Implications for using Mobile (Cellular) Telephones while Driving", Retrieved at << http://virtual.vtt.fi/virtual/proj6/fits/impacts/Lamble_Kauranen_Laakso_Summala_1999.pdf >>, Accident Analysis and Prevention 31, 1999, pp. 617-623.

(Continued)

*Primary Examiner* — Calvin Cheung
*Assistant Examiner* — Luis A Martinez Borrero
(74) *Attorney, Agent, or Firm* — Dan Choi; Carole Boelitz; Micky Minhas

(57) ABSTRACT

Among other things, one or more techniques and/or systems are disclosed for mediating tasks in real-time for safety-related concerns. A nature for a safety-related primary task, such as contextual elements of the task, is determined; and a nature of a secondary task that draws attention away from the primary task is also determined. A risk factor for a potential lack of cognitive resources which may be needed by the primary task is determined by applying the nature of the primary task and the nature of the secondary task to a trained risk factor model. The risk factor is applied to one or more safety-related systems in real-time, for example, to mitigate potential safety concerns.

20 Claims, 8 Drawing Sheets

(56) References Cited

U.S. PATENT DOCUMENTS

| | | | |
|---|---|---|---|
| 7,039,551 B2* | 5/2006 | Shu et al. | 702/182 |
| 7,072,753 B2* | 7/2006 | Eberle et al. | 701/45 |
| 7,116,234 B2 | 10/2006 | Mohri | |
| 7,194,347 B2* | 3/2007 | Harumoto et al. | 701/45 |
| 7,248,997 B2* | 7/2007 | Nagai et al. | 702/182 |
| 7,292,152 B2* | 11/2007 | Torkkola et al. | 340/576 |
| 7,344,251 B2* | 3/2008 | Marshall | 351/246 |
| 7,349,782 B2* | 3/2008 | Churchill et al. | 701/45 |
| 7,394,393 B2* | 7/2008 | Zhang et al. | 340/576 |
| 7,423,540 B2* | 9/2008 | Kisacanin | 340/576 |
| 7,438,418 B2* | 10/2008 | Marshall | 351/246 |
| 7,574,254 B2* | 8/2009 | Milgramm et al. | 600/544 |
| 7,579,942 B2* | 8/2009 | Kalik | 340/435 |
| 7,629,899 B2* | 12/2009 | Breed | 340/903 |
| 7,639,148 B2* | 12/2009 | Victor | 340/576 |
| 7,642,922 B2* | 1/2010 | Itou | 340/576 |
| 7,652,583 B2* | 1/2010 | Sanchez et al. | 340/576 |
| 7,692,548 B2* | 4/2010 | Bonefas et al. | 340/575 |
| 7,692,549 B2* | 4/2010 | Bonefas et al. | 340/575 |
| 7,692,550 B2* | 4/2010 | Bonefas et al. | 340/575 |
| 7,692,551 B2* | 4/2010 | Bonefas et al. | 340/575 |
| 7,705,738 B2* | 4/2010 | Fukaya et al. | 340/576 |
| 7,801,332 B2* | 9/2010 | Albertson et al. | 382/107 |
| 7,831,314 B2* | 11/2010 | Egami | 700/1 |
| 7,831,350 B2* | 11/2010 | Goudy | 701/36 |
| 7,880,621 B2* | 2/2011 | Kalik | 340/573.1 |
| 7,902,693 B2* | 3/2011 | Hijikata et al. | 307/10.1 |
| 7,974,748 B2* | 7/2011 | Goerick et al. | 701/28 |
| 7,979,172 B2* | 7/2011 | Breed | 701/23 |
| 8,035,496 B2* | 10/2011 | Hentschel-Bukman et al. | 340/439 |
| 8,068,968 B2* | 11/2011 | Kondoh | 701/96 |
| 8,160,560 B2* | 4/2012 | Geyer et al. | 455/418 |
| 8,164,463 B2* | 4/2012 | Omi | 340/575 |
| 8,295,542 B2* | 10/2012 | Albertson et al. | 382/103 |
| 8,301,108 B2* | 10/2012 | Naboulsi | 455/345 |
| 8,369,608 B2* | 2/2013 | Gunaratne | 382/154 |
| 8,447,072 B2* | 5/2013 | Takahashi et al. | 382/103 |
| 8,487,775 B2* | 7/2013 | Victor et al. | 340/576 |
| 8,688,180 B2* | 4/2014 | Catten | 455/575.9 |
| 2002/0120371 A1* | 8/2002 | Leivian et al. | 701/1 |
| 2002/0138197 A1* | 9/2002 | Schramke et al. | 701/213 |
| 2003/0097047 A1 | 5/2003 | Woltermann et al. | |
| 2004/0252027 A1* | 12/2004 | Torkkola et al. | 340/576 |
| 2005/0030184 A1* | 2/2005 | Victor | 340/576 |
| 2005/0067493 A1* | 3/2005 | Urken | 235/386 |
| 2005/0159853 A1* | 7/2005 | Takahashi et al. | 701/1 |
| 2005/0192730 A1* | 9/2005 | Churchill et al. | 701/45 |
| 2006/0200008 A1* | 9/2006 | Moore-Ede | 600/300 |
| 2007/0013868 A1* | 1/2007 | Pugach et al. | 351/209 |
| 2007/0032914 A1* | 2/2007 | Kondoh et al. | 701/1 |
| 2007/0050110 A1* | 3/2007 | Kondoh et al. | 701/36 |
| 2008/0009965 A1* | 1/2008 | Bruemmer et al. | 700/245 |
| 2008/0077474 A1* | 3/2008 | Dumas et al. | 705/10 |
| 2008/0097699 A1* | 4/2008 | Ono | 701/300 |
| 2009/0164132 A1* | 6/2009 | Jung et al. | 702/19 |
| 2010/0010742 A1* | 1/2010 | Mochizuki | 701/301 |
| 2010/0030586 A1* | 2/2010 | Taylor et al. | 705/4 |
| 2010/0033333 A1 | 2/2010 | Victor et al. | |
| 2010/0052945 A1* | 3/2010 | Breed | 340/903 |
| 2010/0073152 A1* | 3/2010 | Nagamine et al. | 340/425.5 |
| 2010/0082251 A1* | 4/2010 | Kogure | 701/301 |
| 2010/0106387 A1* | 4/2010 | Tsuchida | 701/70 |
| 2010/0156630 A1* | 6/2010 | Ainsbury | 340/540 |
| 2010/0169009 A1* | 7/2010 | Breed et al. | 701/208 |
| 2010/0179719 A1* | 7/2010 | Kimura et al. | 701/31 |
| 2012/0078063 A1* | 3/2012 | Moore-Ede | 600/300 |

OTHER PUBLICATIONS

Patten, et al., "Using mobile telephones: cognitive workload and attention resource allocation", Retrieved at << http://www.cellphonefreedriving.ca/media/3_Patten_AAP_Patten_et_al_2004.pdf >>, Accident Analysis and Prevention 36, 2004, pp. 341-350.

Fletcher, et al., "Road Scene Monotony Detection in a Fatigue Management Driver Assistance System", Retrieved at << http://users.cecs.anu.edu.au/~luke/doc/IV05.pdf >>, Proceedings of the IEEE Intelligent Vehicles Symposium, 2005, pp. 6.

Grimm, et al., "On the Necessity and Feasibility of Detecting a Driver's Emotional State While Driving", Retrieved at << http://www.grimmm.de/research/Publications/Grimm07%20On%20the%20Necessity%20and%20Feasibility%20of%20Detecting%20a%20Drivers%20Emotional%20State%20While%20Driving%20%5BACII-AuthorVersion%5D.pdf >>, Lecture Notes In Computer Science, vol. 4738, Proceedings of the 2nd international conference on Affective Computing and Intelligent Interaction, Sep. 12-14, 2007, pp. 13.

Bailey, et al., "Understanding Changes in Mental Workload during Execution of Goal-Directed Tasks and Its Application for Interruption Management", Retrieved at << http://portal.acm.org/citation.cfm?id=1314689 >>, ACM Transactions on Computer-Human Interaction, vol. 14, No. 4, Jan. 2008, pp. 21-21:28.

Beilock, et al., "On the Fragility of Skilled Performance: What Governs Choking Under Pressure?", Retrieved at << http://citeseerx.ist.psu.edu/viewdoc/download?doi=10.1.1.134.1882&rep=rep1&type=pdf >>, Journal of Experimental Psychology: General, vol. 130, No. 4, 2001, pp. 701-725.

Berthold, et al., "Interpreting Symptoms of Cognitive Load in Speech Input", Retrieved at << http://citeseerx.ist.psu.edu/viewdoc/summary?doi=10.1.1.31.5775 >>, Proceedings of the seventh international conference on User modeling, 1999, pp. 1-10.

Bock, et al., "Car Talk, Car Listen", Retrieved at << http://www.cogsci.msu.edu/DSS/2006-2007/Bock/Chapter%202.pdf >>, Automaticity and Control in Language Processing, 2006, pp. 21-42.

Briem, et al., "Behavioral Effects of Mobile Telephone use During Simulated Driving", Retrieved at << http://austursetur.is/page1/page9/page4/files/Briem%20and%20Hedman%201995.pdf >>, Ergonomics, vol. 38, No. 12, 1995, pp. 2536-2562.

Brumby, et al., "Focus on Driving: How Cognitive Constraints Shape the Adaptation of Strategy while Dialing while Driving", Retrieved at <<http://portal.acm.org/citation.cfm?id=1518950&dl=ACM >>, Conference on Human Factors in Computing Systems, Proceedings of the 27th international conference on Human factors in computing systems, Apr. 4-9, 2009, pp. 1629-1638.

Brumby, et al., "A Cognitive Constraint Model of the Effects of Portable Music-Player Use on Driver Performance", Retrieved at <<http://citeseerx.ist.psu.edu/viewdoc/download?doi=10.1.1.140.655&rep=rep1&type=pdf >>, In the Proceedings of the Human Factors and Ergonomics Society 51st Annual Meeting (HFES), CA: Human Factors and Ergonomics Society, 2007, pp. 5.

Green, Paul., "Driver Distraction, Telematics Design, and Workload Managers: Safety Issues and Solutions", Retrieved at <<http://www.umich.edu/~driving/publications/GreenConvergence04paper4b.pdf >>, Proceedings of the International Congress on Transportation Electronics, SAE Paper No. 2004-21-0022, 2004, pp. 16.

Horrey, et al., "Examining the Impact of Cell Phone Conversations on Driving Using Meta-Analytic Techniques", Retrieved at << http://mysite.verizon.net/horrey/papers/Horrey_HF2006meta.pdf >>, The Journal of the Human Factors and Ergonomics Society, vol. 48, No. 1, 2006, pp. 196-205.

Cacioppo, et al., "Principles of Psychology", Retrieved at << http://psychology.uchicago.edu/people/faculty/cacioppo/jtcreprints/centenary.pdf >>, Personality and Social Psychology Bulletin, vol. 16, No. 4, Dec. 1990, pp. 601-611.

"The Impact of Driver Inattention on Near-Crash/Crash Risk: An Analysis Using the 100-Car Naturalistic Driving Study Data, National Highway Traffic Safety Administration", Retrieved at << http://www.nhtsa.dot.gov/staticfiles/DOT/NHTSA/NRD/Multimedia/PDFs/Crash%20Avoidance/Driver%20Distraction/810594.pdf >>, Apr. 2006, pp. 224.

Lee, et al., "Speech-Based Interaction with In-Vehicle Computers: The Effect of Speech-Based E-Mail on Driver's Attention to the Roadway", Retrieved at <<http://citeseerx.ist.psu.edu/viewdoc/download?doi=10.1.1.61.6367&rep=rep1&type=pdf >>, The Journal of the Human Factors and Ergonomics Society, vol. 43, No. 4, 2001, pp. 1-11.

(56) References Cited

OTHER PUBLICATIONS

Lee, et al., "Collision Warning Timing, Driver Distraction, and Driver Response to Imminent Rear-End Collisions in a High-fidelity Driving Simulator", Retrieved at << http://www.hfes.org/Web/PubPages/Leearticle.pdf >>, The Journal of the Human Factors and Ergonomics Society, vol. 44, No. 2, 2002, pp. 314-334.

Levy, et al., "Task Prioritisation in Multitasking during Driving: Opportunity to Abort a Concurrent Task Does not Insulate Braking Responses from Dual Task Slowing.", Retrieved at << http://www.pashler.com/Articles/Levy_Pashler_JACP2007.pdf >>, Applied Cognitive Psychology, vol. 22, 2008, pp. 20.

Norman, et al., "On Data-Limited and Resource-Limited Processes", Retrieved at << http://wexler.free.fr/library/files/norman%20(1975)%20on%20data-limited%20and%20resource-limited%20processes.pdf >>, Cognitive Psychology, vol. 7, No. 1, 1975, pp. 11.

Redelmeier, et al., "Association between Cellular-Telephone Calls and Motor Vehicle Collisions", Retrieved at <<http://www.vws.org/documents/10.DrivingandCellphones.pdf >>, The New England Journal of Medicine, vol. 336:453-458, No. 7, Feb. 13, 1997, pp. 2.

Ruppin, et al., "Recall and Recognition in an Attractor Neural Network Model of Memory Retrieval", Retrieved at << http://citeseerx.ist.psu.edu/viewdoc/download?doi=10.1.1.12.3437&rep=rep1&type=pdf >>, Oct. 23, 1996, pp. 1-25.

Salvucci, Dario D., "Predicting the Effects of In-car Interface use on Driver Performance: An Integrated Model Approach", Retrieved at << http://citeseerx.ist.psu.edu/viewdoc/download?doi=10.1.1.72.4864&rep=rep1&type=pdf >>, International Journal of Human-Computer Studies, vol. 55, 2001, pp. 24.

Salvucci, et al., "iPod Distraction: Effects of Portable Music-Player use on Driver Performance", Retrieved at << http://portal.acm.org/ft_gateway.cfm?id=1240665&type=pdf >>, Conference on Human Factors in Computing Systems, Proceedings of the SIGCHI conference on Human factors in computing systems, Apr. 28-May 3, 2007, pp. 243-250.

Strayer, et al., "Driven to Distraction: Dual-task Studies of Simulated Driving and Conversing On a Cellular TelePhone", Retrieved at << http://www.psych.utah.edu/AppliedCognitionLab/PS-Reprint.pdf >>, Psychological Society, vol. 12, No. 6, Nov. 2001, pp. 462-466.

Wickens, Christopher D., "Multiple Resources and Performance Prediction", Retrieved at << http://hci.rwth-aachen.de/tiki-download_wiki_attachment.php?attId=51 >>, Theoretical Issues in Ergonomics Science, vol. 3, No. 2, Apr. 1, 2002, pp. 159-177.

Alm; et al., "The effects of a mobile telephone task on driver behavior in a car following situation", Accident Analysis and Prevention, 27 (5). 707-715, Apr. 12, 1995.

Beilock; et al., "When Attention becomes Counterproductive: Divided Versus Skill-focused Attention in Performance of Sensorimotor Skills by Novices and Experts", Journal of Experimental Psychology: Applied 2002, vol. 8. No. 1, 6-16.

Brookhuis; et al., "The effects of mobile telephoning on driving performance", Accident Analysis and Prevention, vol. 23, No. 4, pp. 309-316, 1991.

Brown; et al., "Interference between concurrent tasks of driving and telephoning", Journal of Applied Psychology, vol. 53, No. 5, pp. 419-424, 1969.

Fisk; et al., "Automatic and controlled processing theory and its applications to human factors problems", in Human Factors Psychology, North-Holland Publishing Co., 1987, pp. 159-197.

Hoedemaeker; et al., "Attuning In-car User Interfaces to the Momentary Cognitive Load", Springer-Verlag, Berlin, 2007, pp. 286-293.

Logan, Gordon D., "Repetition priming and automaticity: Common underlying mechanisms?" Cognitive Psychology, 22 (1). 1-35, 1990.

McKnight; et al., "The effect of cellular phone use upon driver attention", Accident Analysis and Prevention, vol. 25. No. 3, pp. 259-265, 1993.

Navon, David, "Attention Division or Attention Sharing?", Attention and Performance, 9, pp. 133-146, 1984.

Navon; et al., "On the Economy of the Human Processing System", A Model of Multiple Capacity. Psychological Review, vol. 86, No. 3, pp. 254-255, 1979.

Newtson; et al., "The Perceptual Organization of Ongoing Behavior". Journal of Experimental Social Psychology, 12, pp. 436-450, Oct. 17, 1976.

Nunes; et al., "Cognitive Demands of hands-free-phone conversation while driving", Transportation research Part F, 5. pp. 133-144, Mar. 19, 2002.

Shiffrin; et al., "Controlled and automatic human information processing ii: Perceptual learning, automatic attending and a general theory", Psychological Review, vol. 84, No. 2, pp. 127-190, Mar. 1977.

Violanti, JM, "Cellular phones and traffic accidents", Public Health, 111 (6), pp. 423-428, 1997.

Wickens; et al., "Compatibility and resource competition between modalities of input, output and central processing" Human Factors, 25. pp. 227-248, 1983.

\* cited by examiner

MEDIATION OF TASKS BASED ON ASSESSMENTS OF COMPETING COGNITIVE LOADS AND NEEDS

BACKGROUND

Human attention can be divided among a plurality of tasks. For example, current automobiles comprise multiple systems that may require the operator's attention at a same or different time. Further, as an example, interpersonal communications using mobile devices has become ubiquitous, and often occurs during performance of another task (e.g., driving). Commonly, certain tasks, such as driving, become somewhat automated, particularly when the operator is very familiar with the route, and there are few distractions or other issues to draw the operator attention. In these situations, for example, the performers of the initial or primary task often feel comfortable enough to engage in a secondary task, such as communicating with a third party using a mobile device.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

When dividing attention between a primary task (e.g., operating a vehicle), which can be somewhat automated, and a secondary task (e.g., communicating with a third-party), people often feel comfortable performing the second task due to automation and comfort level. However, it is desirable to maintain a level of safety, as studies have shown that a secondary task can take up cognitive resources that are needed by the primary task, for example, particularly when sudden changes may occur in the environment, which may lead to less than desirable outcomes (e.g., accidents). For example, a pilot flying a plane while browsing the Internet may miss an intended landing; a person texting while driving may not see a pedestrian in the road; a train operator that is interacting with their mobile device may not notice a stop signal.

Among other things, one or more techniques and/or systems are disclosed that can provide for automated detection and classification of a cognitive load of an operator of a piece of equipment or system (the primary task), such as driving by the driver of a vehicle. The classification can be based on surface and/or deeper analysis of the primary task (e.g., the speed, complexity, and situation of a driving situation), and the cognitive load that may be needed to perform a secondary task being performed concurrently (e.g., a hands-free conversation of a certain level of cognitive engagement in a car). Further, the complexity of the primary task can be based on characteristics of the task, and inferences about the current or forthcoming primary automated engagement can guide decisions based on the analysis of the two tasks, and potential intervening interferences (e.g., stop signs, curves in the road, etc.).

In one embodiment for mediating tasks in real-time for safety-related concerns, a nature of a primary task that has a relation to safety (e.g., human safety) is determined, and a nature of a secondary task that draws attention away from the primary task is also determined. A risk factor that can represent a potential lack of cognitive resources for the primary task is determined by applying the nature of the primary task and the nature of the secondary task to a trained risk factor model (e.g., classifier trained to identify risk cost of engaging in both tasks). The risk factor can then be applied to one or more safety-related systems in real-time, for example, to mitigate potential safety concerns.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
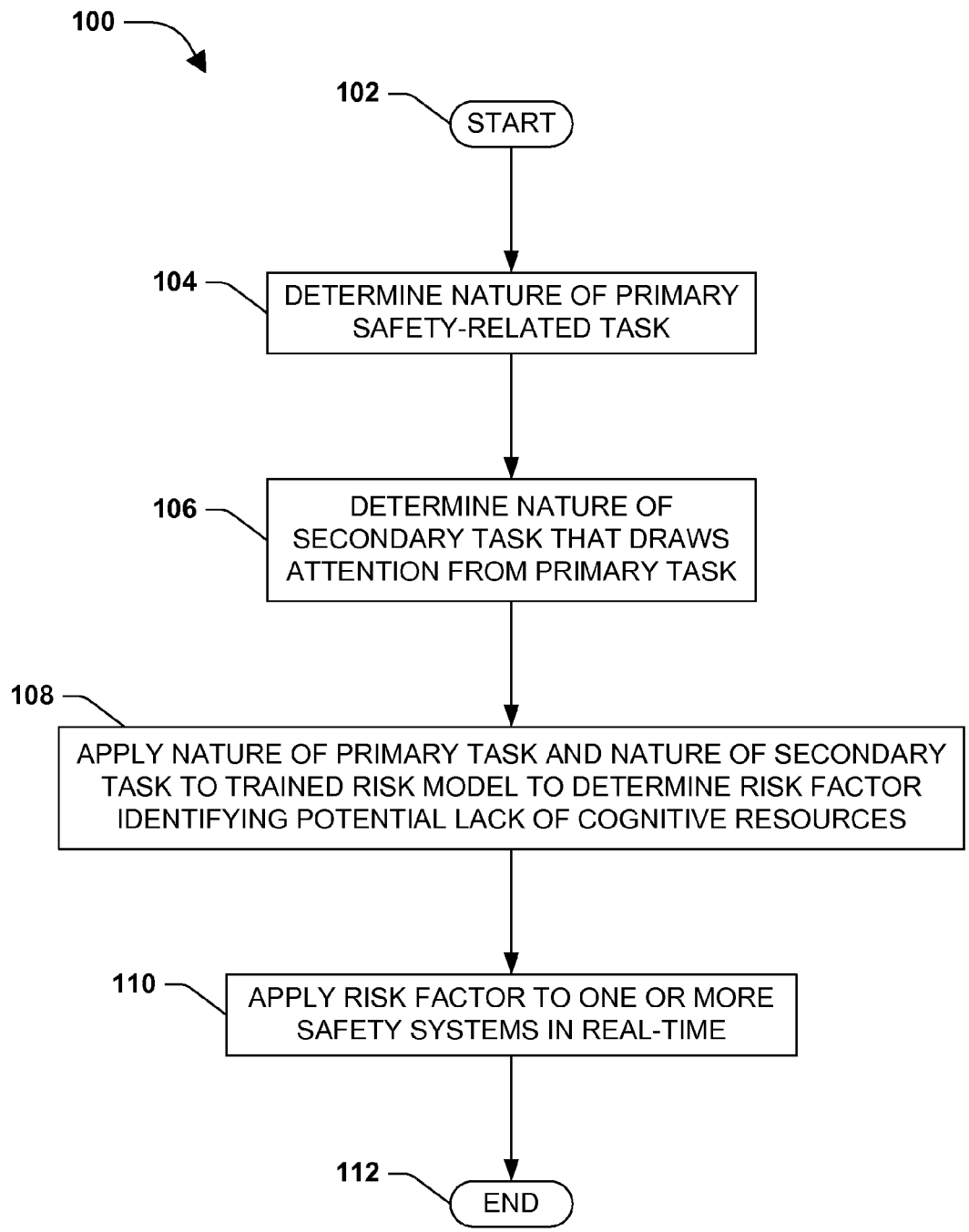
FIG. 1 is flow diagram of an exemplary method for mediating tasks in real-time for safety-related concerns.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

FIG. 1 is flow diagram of an exemplary method 100 for mediating tasks in real-time for safety-related concerns. The exemplary method 100 begins at 102 and involves determining a nature of a primary task related to safety, at 104. In one embodiment, a primary task may comprise operating some system where an operator's attention is directed toward the operation of the system. As an example, a primary task may comprise operating a vehicle, such as driving an automobile, train, airplane, or some other transportation typically, which necessitates the operator's attention be directed toward the vehicle's operation, and where the lack of attention could cause an undesired effect (e.g., accident). The primary task is not limited to any particular embodiment, merely that the primary task have a safety component, for example, such that lessened cognitive resources directed toward the primary task may result in some safety concerns. That is, vehicular and/or transportation related examples provided herein are just that, non-limiting examples.

In one embodiment, determining the nature of the primary task can comprise identifying contextual elements of the primary task. For example, situational conditions (e.g. an object unexpectedly appearing in the driving path) can add complexity to a task, thereby increasing a need for cognitive resources (e.g., more visual attention) by the operator. Further, some contextual elements may provide the operator with a sense that their cognitive resources can be divided more readily, such as driving a car along a flat, smooth highway during the day, with little traffic. Therefore, in one embodiment, identifying the nature of the primary task can comprise gathering information about the context of the primary task, where situational elements can be identified, for example, and used to put the primary task in context for probabilistic determinations about the task.

At 106 in the exemplary method 100, a nature of a secondary task is determined, where the secondary task draws attention away from the primary task. In one embodiment, the secondary task may comprise a task that is performed while performing the primary task, where the secondary task utilizes cognitive resources that may also be used to perform the primary task. That is, for example, the secondary task can distract the operator of a vehicle from performing the primary task of operating the vehicle. As an example, communicating with a third-party using a mobile device is a common secondary task performed by operators of vehicles. In this example, people often use mobile phones to talk, text, and/or email while driving their cars. Depending on the nature of the conversation or task that is being undertaken, cognitive resources that may be used to manage driving safety may be inadvertently diverted towards the secondary task.

Further, in one embodiment, determining the nature of the secondary task can comprise identifying contextual elements of the secondary task. For example, with similarities to the primary task, situational conditions can add complexity to a secondary task, necessitating that more cognitive resources may be needed for the secondary task, thereby drawing more cognitive resources away from the primary task. As an illustrative example, when a vehicle operator answers a call on their mobile phone, they may look down to see who is calling, thereby diverting their visual resources away from the operation of the vehicle. As another example, while on a call, they may be asked to recall some information, thereby distracting them from the primary task of driving.

At 108 in the exemplary method 100, a risk factor, which can represent a potential lack of cognitive resources, is determined by applying the nature of the primary task and the nature of the secondary task to a trained risk factor model. In one embodiment, a risk factor model may be developed using empirical data to train a type of probabilistic model (e.g., classifier) to identify a risk factor.

For example, a probabilistic model can comprise a set of mathematical equations that provide a representation of behaviors of something (e.g., object, action) when random variables are introduced. In this example, the probabilistic model can be trained over different primary tasks for different secondary tasks, where various contextual elements are introduced to determine training risk factors. In this example, the contextual elements can come from empirical data (e.g., testing on subjects performing the primary and secondary tasks), and the resulting risk factor can identify the various outcomes, such as longer response times to stimulus arising in relation to the primary task. Further, the model can be adjusted accordingly during training to yield desired risk factor outcomes for the variety of potential situations.

As an illustrative example, a study was performed where participants drove simulated vehicles (e.g., primary task) on routes composed of segments that posed different types of navigation challenges (e.g., various contextual elements of primary task). While driving, the participants would periodically respond to a mobile phone call (e.g., secondary task) by pushing a button to initiate a hands-free operation. The calls were one of three kinds of engagement: listen to news and facts (e.g., assimilate information), answer questions (e.g., retrieve information), and provide directions (e.g., generate information) (e.g., contextual elements of secondary task).

Additionally, in this study, for respective driving trials, the drivers were asked to either focus mainly on their driving, on the conversation, or do their best to both drive and handle the phone-based tasks. As an example, results of the driving trials (e.g., were the drivers distracted based on response times or visual observation, did accidents occur, etc.) can be used to determine how a risk factor correlates to the model. In one embodiment, data collected from such a study (or ongoing studies or collection of empirical evidence) can be used to train a probabilistic model to determine a risk factor for engaging in both the primary and secondary task where various contextual elements are introduced. Further, continually collecting such empirical data can provide for continually updating and refining the probabilistic model to determine risk factors.

At 110 in the exemplary method 100, the risk factor is applied to one or more safety-related systems in real-time. In one embodiment, the risk factor may trigger one or more systems to take control away from the operator, and perform automated operation, for example. As an example, recently, pilots were cited for working on a laptop computer (e.g., secondary task) while flying a passenger airplane (e.g., primary task). The airplane was approaching the flight landing path (e.g., contextual elements of primary task), and the pilots were too focused on what they were doing on the laptop (e.g., contextual elements of the secondary task) to land the plane, resulting in continued flight past the desired landing zone. As an example, if the pilots were actually in the flight path for landing and the risk factor indicated that the pilots may not have the cognitive resources (e.g., necessary attention) to perform the landing, the risk factor can be applied to activate and/or deactivate one or more systems to mitigate performance of the secondary task. For example, a system may prevent use of the laptop (e.g., or other communications device) during landing of the plane and/or automated controls may take over to land the plane.

In another embodiment, the risk factor may be applied to provide one or more alerts to the primary task performer. For example, warning systems can be activated to let the pilots know that they may not have the necessary cognitive resources to perform both the primary and secondary tasks, thereby allowing the operator to disengage from the secondary task. Such warnings may occur in one embodiment, in a verbal instruction form and/or as one or more other types of auditory cues (e.g., alarm(s)) so as to minimize distraction from the primary task, for example. In another embodiment, the risk factor can be applied to activate one or more systems that mitigate performance of the secondary task. For example, a system may prevent use of the laptop (e.g., or other communications device) during landing of the plane.

Having applied the risk factor to one or more safety systems in real-time, the exemplary method 100 ends at 112.

Figure 2:
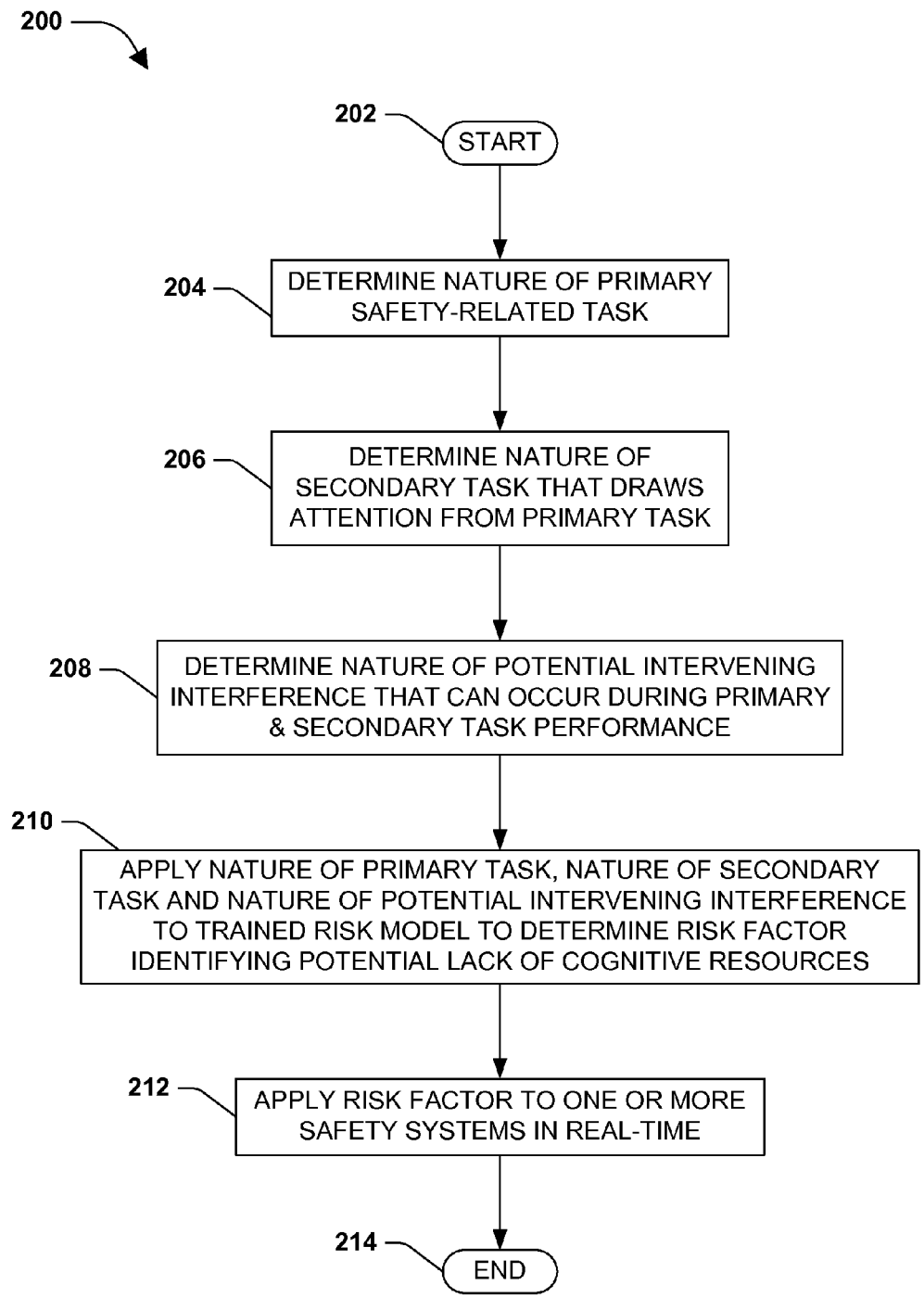
FIG. 2 is a flow diagram illustrating an alternate embodiment of an exemplary method for mediating tasks in real-time for safety-related concerns.

FIG. 2 is a flow diagram illustrating an alternate embodiment of an exemplary method 200 for mediating tasks in real-time for safety-related concerns. The alternate exemplary method 200 begins at 202 and involves determining the nature of the primary, safety-related task, at 204, as described above. At 206, the nature of the secondary task that draws attention away from the primary task is determined, as described above.

At 208, a nature of a potential intervening interference that may occur during the performance of the primary and secondary tasks is determined. When a performer is undertaking a primary task and a secondary task, cognitively, the performer may create an interleaving of tasks into a somewhat smooth combined transaction.

As an example, when the primary task is relatively easy and/or rote for the performer (e.g., driving a well-known route on a smooth, flat highway with little traffic) the performer may often feel that a secondary task (e.g., answering a phone call) will have little or no deleterious impact on the primary task. In this example, the secondary task can be cognitively decomposed into chunks, where a performer's cognitive state for the primary task remains relatively unchanged. In such situations, merely looking away for a second may not have any effect on the primary task, and the performer can return to the primary task with little or no effect. Further, the individual chunks within the secondary task can be interleaved into the primary task.

However, an unexpected intervening event, for example, can break down this smooth interleaving of the primary and secondary tasks, for example. In one embodiment, there may be a plurality of potential intervening interferences that could occur while undertaking the primary task. For example, while operating a vehicle, traffic in front of the vehicle may stop, something (or someone) may suddenly be presented in front of the vehicle, a traffic signal may indicate a stop, or even sudden weather events may interfere. These example (and more) may comprise potential intervening interferences with the primary task, which, if not handled appropriately, may result in a safety-related issue (e.g., accident).

Much like as was described above for the primary and secondary tasks, respective potential intervening interferences can have contextual elements. For example, there may be interferences that are a minor distraction, or may be a serious and immediate concern, necessitating that more cognitive resources may be needed to handle the intervening interference. For example, a minor interference may be an indication that the vehicle is low on fuel and the operator may need to stop soon to refuel. A serious and immediate interference may be a child running out in front or the vehicle, necessitating an immediate avoidance maneuver, for example. However, if the cognitive resources are divided between the primary and secondary task, the operator may not be prepared for the interference.

At 210 in the exemplary method 200, a risk factor is determined for a potential lack of cognitive resources by applying the nature of the primary task, the nature of the secondary task, and the nature of the potential intervening interference to the trained risk factor model. In this embodiment, for example, the contextual elements of the potential intervening interference can be used, along with those of the primary and secondary tasks, to identify a potential risk factor for performing the primary and secondary tasks concurrently.

As described above, at 214, the risk factor can be applied to one or more safety systems in real-time. Having applied the risk factor to safety systems, the exemplary method 200 ends at 214.

Figure 3:
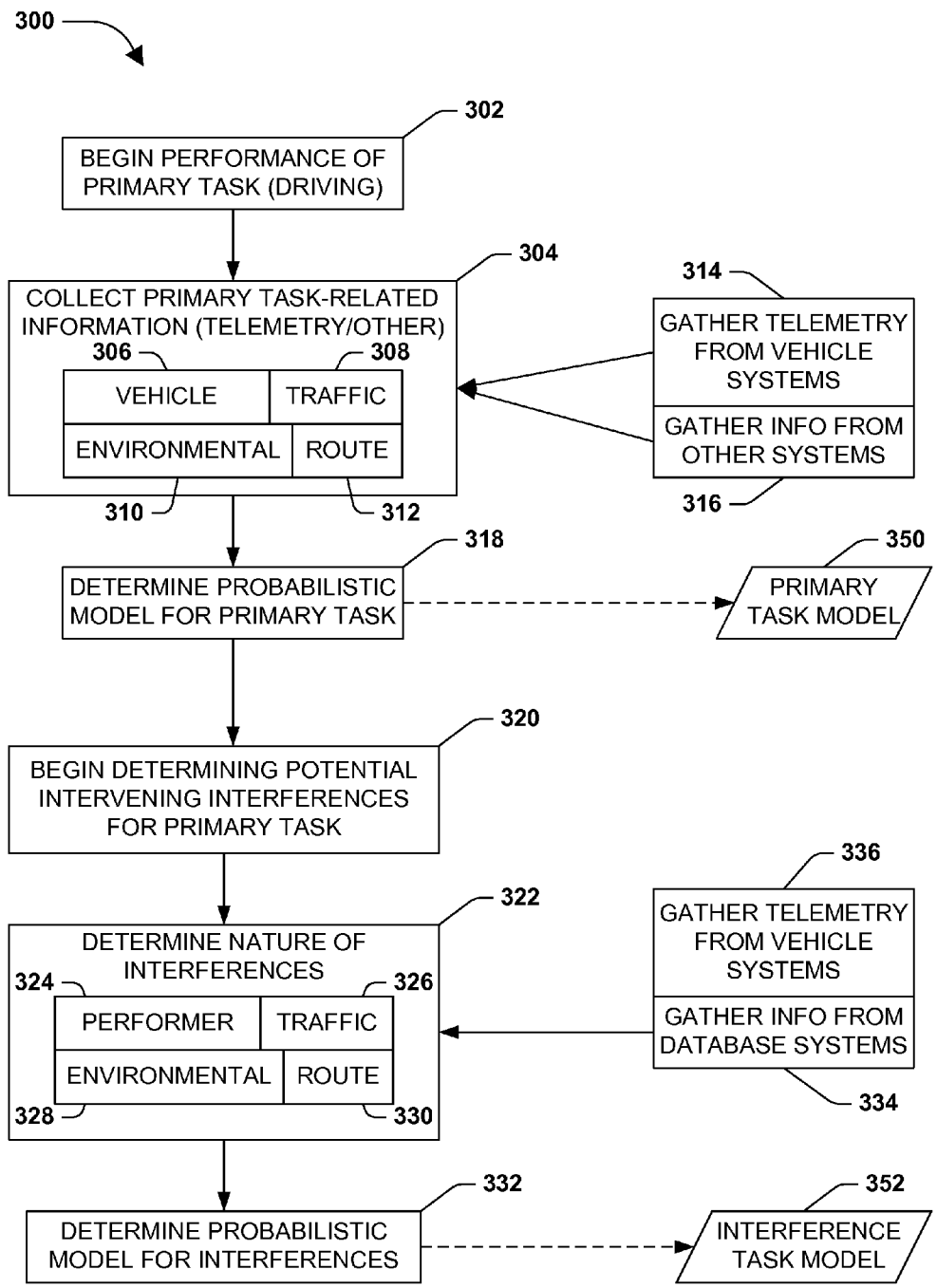
FIG. 3 is a flow diagram illustrating an exemplary embodiment where one or more techniques described herein may be implemented.

FIG. 3 is a flow diagram illustrating an exemplary embodiment 300 where one or more techniques described herein may be implemented. At 302, a primary task is initiated, such as operating a vehicle (e.g., driving). At 304, the nature of the primary task-related is determined by determining a context of the vehicle operation task in real-time. For example, vehicle telemetry can be gathered from on-board vehicle systems, at 314. Further, other, non-vehicle systems, at 316, may provide information to be gathered to determine the contextual elements of the primary task.

In one embodiment, information about vehicle conditions 306 may be gathered, such as sensor data from a speed sensor, operational conditions of the vehicle from an on-board diagnostic system, directional information from a sensor in the steering (e.g., steering column), road conditions from handling telemetry (e.g., shock sensors), even weather conditions from external rain/wind detection sensors (e.g., windshield wiper speed from automated wiper systems). In this embodiment, a plurality of different sensors may provide real-time telemetry that can be used to identify contextual elements for the primary task.

In another embodiment, route complexity 312 details may be gathered and used as contextual elements for the primary task. For example, an on-board (or remote) navigation system can provide real-time vehicle location data (e.g., using GPS or radar), and a stored route map can help identify potential routes of travel. Further, the stored (or updated on-the-fly) mapping system may be able to provide information about immediate or intended routes of travel where route conditions may be more (or less) complex, such as winding curves, school zones, blind turns, potential city congestions, etc.

In another embodiment, traffic condition 308 information may be may be gathered and used as contextual elements for the primary task. For example, currently traffic services that identify traffic conditions can be provided to an on-board system. In this example, the traffic information can be retrieved from the on-board traffic service. Further, sensors in a vehicle may be able to provide information about proximity of other vehicles, and the telemetry from these sensors can be used to indicate a real-time traffic conditions. In another embodiment, environmental conditions 310 may be may be gathered and used as contextual elements for the primary task. For example, a weather service can provide local, real-time weather conditions, and predicted conditions. Further, vehicle sensors may be able to determine, for example, immediate conditions, such as temperature, rain, wind speed, and others.

At 318, a probabilistic model 350 can be determined for the primary task. In one embodiment, the primary task may be classified based on the contextual information gathered about the primary task, such as using a predictive modeling technique or classifier trained for the purpose. For example, a classification for a primary task where an experienced train conductor is driving a train down a well known, visually clear stretch of track, out in the country, with few or no crossing, may be very different than for a new conductor, on an unknown stretch of track, in a congested city, with poor visibility conditions due to weather. In this embodiment, the primary task model 350 may be used for risk factor determination.

At 320, based on the primary task, potential intervening interferences can be determined for the primary task. For example, based on a planned or potential route of travel, the potential interferences may be identified, such as traffic congestion, stopping, high density surprise areas (e.g., school zones, neighborhood parks, high accident area), construction, and others. At 322, the nature of the respective potential interferences can be determined, by gather in information about the potential intervening interferences that could interfere with a primary task operation (e.g., vehicle operation).

Determining the nature of the potential intervening interference can comprise determining conditions for traffic-related interferences 326. For example, information about traffic-related interferences may comprise information gather from database systems, at 334, such a traffic services, or vehicle telemetry, at 336, such as on-board proximity sensors (e.g., detecting a car in front, airplane nearby, train on the track, etc.). Determining the nature of the potential intervening interference can also comprise determining conditions for route-related interferences 330. For example, an on-board navigation system may be able to provide details about route conditions that may necessitate most of the operator's cognitive resources, such as complex turns, high-speed sections, rough or dangerous roads, or stopping points.

Further, determining the nature of the potential intervening interference can also comprise determining conditions for environmental related interferences 328. For example, both remote and/or an on-board services/sensors may be able to provide weather-related information, such as rain, snow, or other conditions that may provide an interference to typical vehicle operation. Additionally, determining the nature of the potential intervening interference can also comprise determining primary task performer related interferences 324. For example, an operator nodding off during primary task operation may be detected in real-time by on-board sensors, at 336.

At 332, a probabilistic model for the potential intervening interferences 352 can be determined, such as described above for the primary probabilistic model determination.

Figure 4:
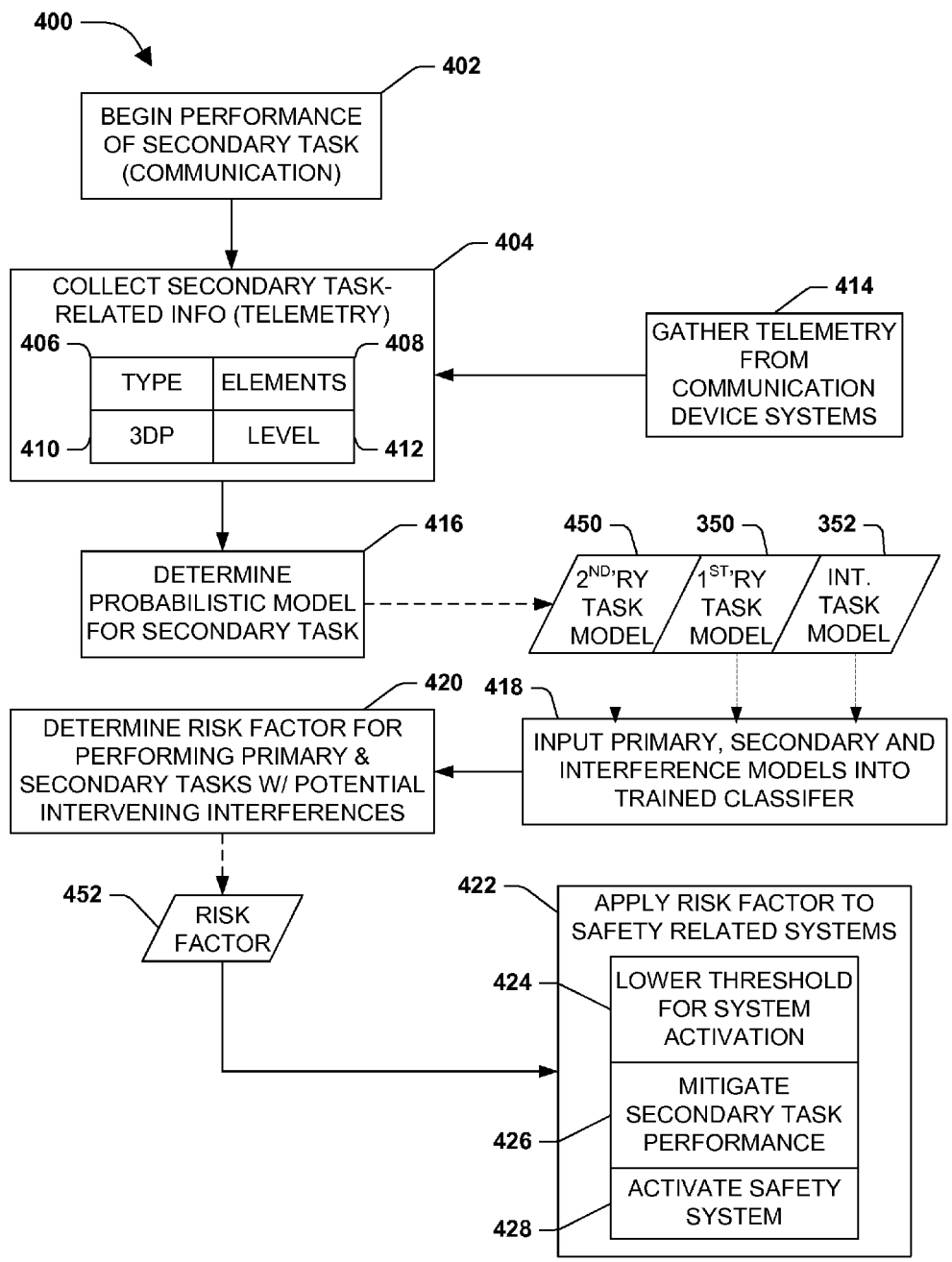
FIG. 4 is a flow diagram illustrating another exemplary embodiment where one or more techniques described herein may be implemented.

FIG. 4 is a flow diagram illustrating another exemplary embodiment 400 where one or more techniques described herein may be implemented. At 402, a secondary task is undertaken (e.g., some form of communication), for example, in conjunction with the primary task of FIG. 3. For example, while the vehicle operator is driving they receive a call on their mobile device and attempt to answer and engage in the call.

At 404, contextual information for the secondary task, such as a communications-related task, can be collected in real-time. For example, the contextual elements of the communications-related task can comprise real-time information related to the operator's mobile communications device interaction with a third party (e.g., talking on the phone). In one embodiment, real-time telemetry can be gathered for the secondary task, such as communication information from one or more communication device related systems 414.

For example, a type of communication 406 may be determined from the communications device, such as a text message, call, email, information retrieval from website, etc. Further, elements of the communication 408 can be detected that may be used to give context to the secondary task. For example, speech recognition systems can determine whether a question is being asked. In this example, a when a question is asked of the operator performing the primary task it may require some recall cognitive resources on behalf of the operator.

Studies have shown that when a person attempts to recall information they typically utilize a significant portion of their cognitive resources, for example, which may be required for performance of the primary task. As an example, the operator may be asked to give directions to a place that is very familiar to them, where the cognitive resources needed may be interleaved more readily with the performance of driving the vehicle, due to their ability to break both tasks into chunks, as described above. However, if they are asked to recall something that is not readily known (e.g. directions to a destination they have not traveled to in many years), more cognitive resources may be directed toward the secondary task, which may cause problems performing the primary task.

Further, information related to the third-party 410 with whom the task performer is communicating may be determined as a contextual element of the secondary task. For example, caller ID may be used to identify a caller, email username to a recipient, or username/ID for a text recipient. Further, in this example, an operator talking with their boss, wife, husband, mother or father, may have a different stress level or concentration level than when talking to a friend or other person, thereby causing different levels of cognitive resources to be utilized. Additionally, a level of interaction 412, for example, can be determined for contextual information of the secondary task. For example, if the operator is engaged in a long conversation, back and forth texting, internet searching, etc., this can be determined by retrieving telemetry from the communications device, at 414. For example stress analysis of voice signals and/or speech patterns that suggest stress can be detected in a conversation, and an increase in cognitive demand, and/or a transition between cognitive tasks, for example, may be inferred from the stress analysis. In one embodiment, the communications telemetry can be combined (e.g., matched) with telemetry from the vehicle to identify when an operator may be having trouble performing the primary task while engaged in the secondary task.

At 416, a probabilistic model for the secondary task 450 is determined, much as described above for the primary task. At 418, the secondary task model 450, and the primary 350 and interference 352 task models, from FIG. 3, are input into a trained classifier. As described above, the classifier can be trained to determine the risk factor, such as by using labeled classification data for one or more primary and secondary tasks. The classifier can be run over the inputs to determine the risk factor 452 for performing the primary task and secondary tasks at a same time, with the potential for the intervening interferences.

In one embodiment, the risk factor may represent a risk-based cost associated with a potential lack of cognitive resources for the primary task, when divided amongst the primary and secondary tasks. The risk-based cost takes into account the potential for an intervening event, for example, based on the interference model. For example, the risk factor may represent (e.g., in numerical or other form) a risk level for driving a vehicle in traffic, in the rain on a city road at night, while talking on the phone to your boss who is asking you to recall what happened in a meeting yesterday, and your coming up to a busy intersection. In this example, the risk factor may be high.

At 422, the risk factor can be applied to safety-related systems. In one embodiment, a threshold for activating a safety related system may be lowered, at 424, based on the risk factor. For example, systems that may pose a safety concern in certain situations often comprise a threshold for activating some built-in safety system (e.g., alert, switch over, shut down, slow down, turn off) when those situations are imminent (e.g., nuclear melt-down, airplane collision, intrusion in a dangerous area of production line machinery). In this embodiment, for example, a threshold that is met in order to activate the safety system can be lowered (or raised) so that the safety system is more sensitive to activation at an earlier time.

Further, in one embodiment, the risk factor may be applied to mitigate performance of the secondary task, at 426. For example, if a driver is talking on the phone while driving, and the risk factor indicates a risk cost that is higher than a desired cost (e.g., too risky to be dividing their cognitive resources based on the situation) the phone call may be cut off, such as with a courteous message to both parties indicating a reason for the disconnection. As another example, the phone call may be put on hold until the risk factor falls below a desired level of risk cost (e.g., the driver is no longer driving over an old one lane bridge).

Additionally, the operator may be prevented from making or receiving any calls, texts, emails or other communication's alerts until the risk factor meets the desired risk cost threshold for dividing the operator's cognitive resources. In another embodiment, the safety-related systems may be applied externally to the immediate vicinity of the operator. For example, when traveling through a school zone, high accident area, during high traffic congestion, or other areas that may require more use of the operator's cognitive resources, a system may mitigate use of communications devices in certain situations (e.g., certain hours, weather, other conditions).

Applying the risk factor to safety-related systems can also comprise activating a safety related system. For example, upon approach to land at an airport, if the risk factor indicates that the pilots of the airplane are sharing too much of their cognitive resources with a secondary task, an automated landing system can be activated to provide for landing the plane. As another example, a car's braking system may be activated when a driver is distracted by texting and the traffic in front suddenly stops, or it is determined that they are entering a high density surprise area (e.g., where more intervening interferences may occur). Further, cars and other vehicles are currently equipped with many safety related systems (e.g., driver alerts, control take over, system shut down) that may immediately implement the use of a risk factor to identify when to activate. In one embodiment, this can serve as an initial safeguard against unexpected events and may be followed by an automatic suspension of the secondary task so that the operator has time to redirect attention to the primary task, for example.

Figure 5:
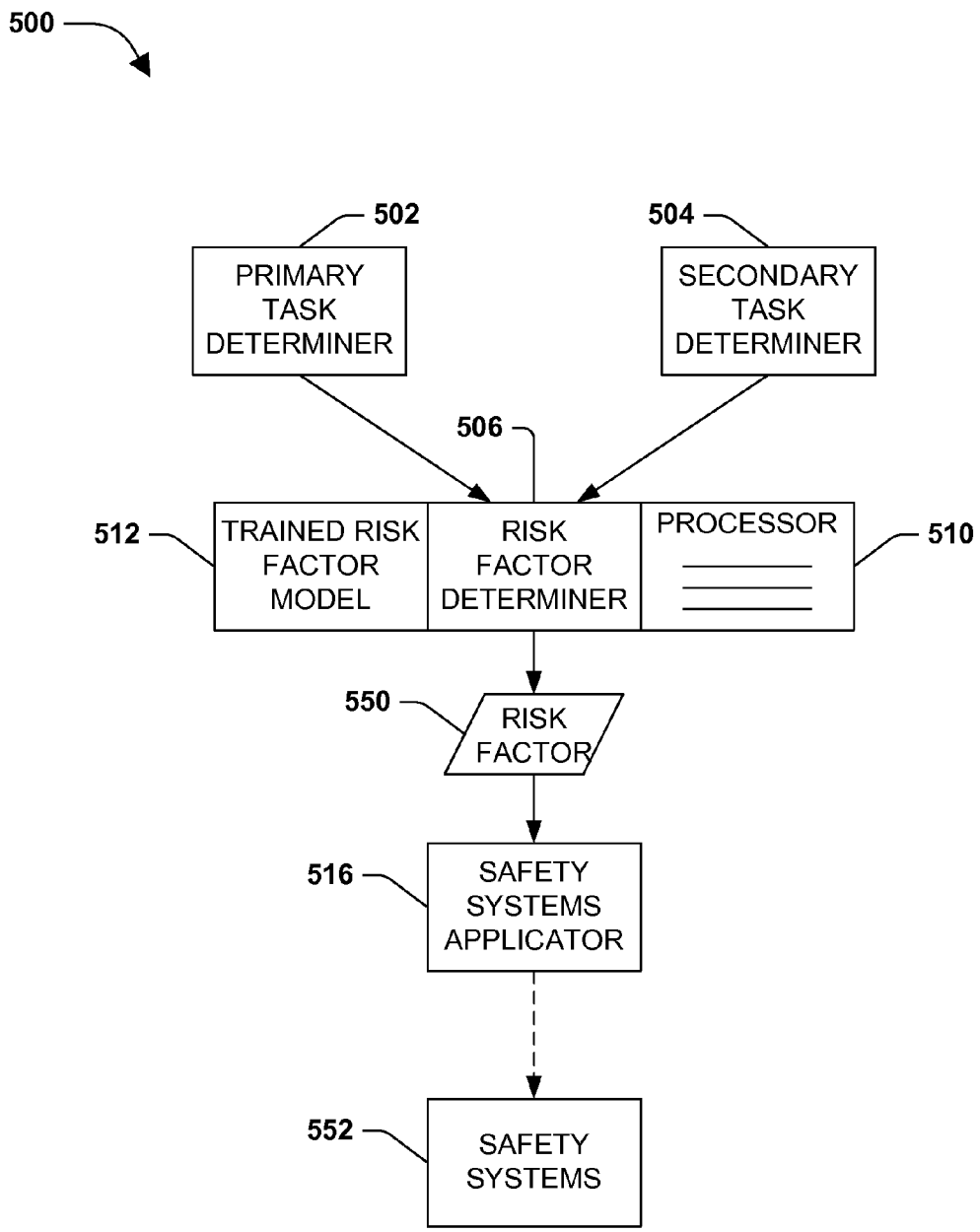
FIG. 5 is a component diagram of an exemplary system for mediating tasks in real-time for safety-related concerns.

A system may be devised that provide for facilitating safety when an individual attempts to perform two or more tasks at a same time, thereby dividing their cognitive resources between the tasks. FIG. 5 is a component diagram of an exemplary system 500 for mediating tasks in real-time for safety-related concerns. A primary task determination component 502 determines one or more primary task related factors for a safety-related primary task, and a secondary task determination component 504 determines one or more secondary task related factors for a secondary task that draws attention away from the primary task. That is, for example, contextual elements of the primary and secondary tasks can be identified, such as for determining a risk associated with performing both tasks concurrently.

A risk factor determination component 506 is operably coupled with the primary task determination component 502, the secondary task determination component 504 and a computer-based processor 510. The risk factor determination component 506 determines a risk factor 550 for a potential lack of cognitive resources for the primary task (e.g., as they are divided with the second task) by applying the one or more primary task related factors and the one or more secondary task related factors to a trained risk factor model 512.

In one embodiment, the trained risk factor model 512 can be trained to provide risk factor determinations by running an untrained classifier over sets of labeled data that indicate potential risks for performing both a primary and secondary task, given particular circumstances. Training information can be provided by empirical data, learned from performing studies in various situations, for example. In this embodiment, when the primary and secondary factors are input to the trained classifier, a risk factor can be determined, in accordance with the prior training.

A safety systems application component 516 is operably coupled with the risk factor determination component 506, and it applies the risk factor 550 to one or more safety-related systems 552 in real-time. For example, the risk factor 550 can indicate a potential risk cost for performing both the primary and secondary task at a same time, given the circumstances. The risk factor can be sent to the safety systems, which may perform some action based on a desired risk factor threshold, for example.

Figure 6:
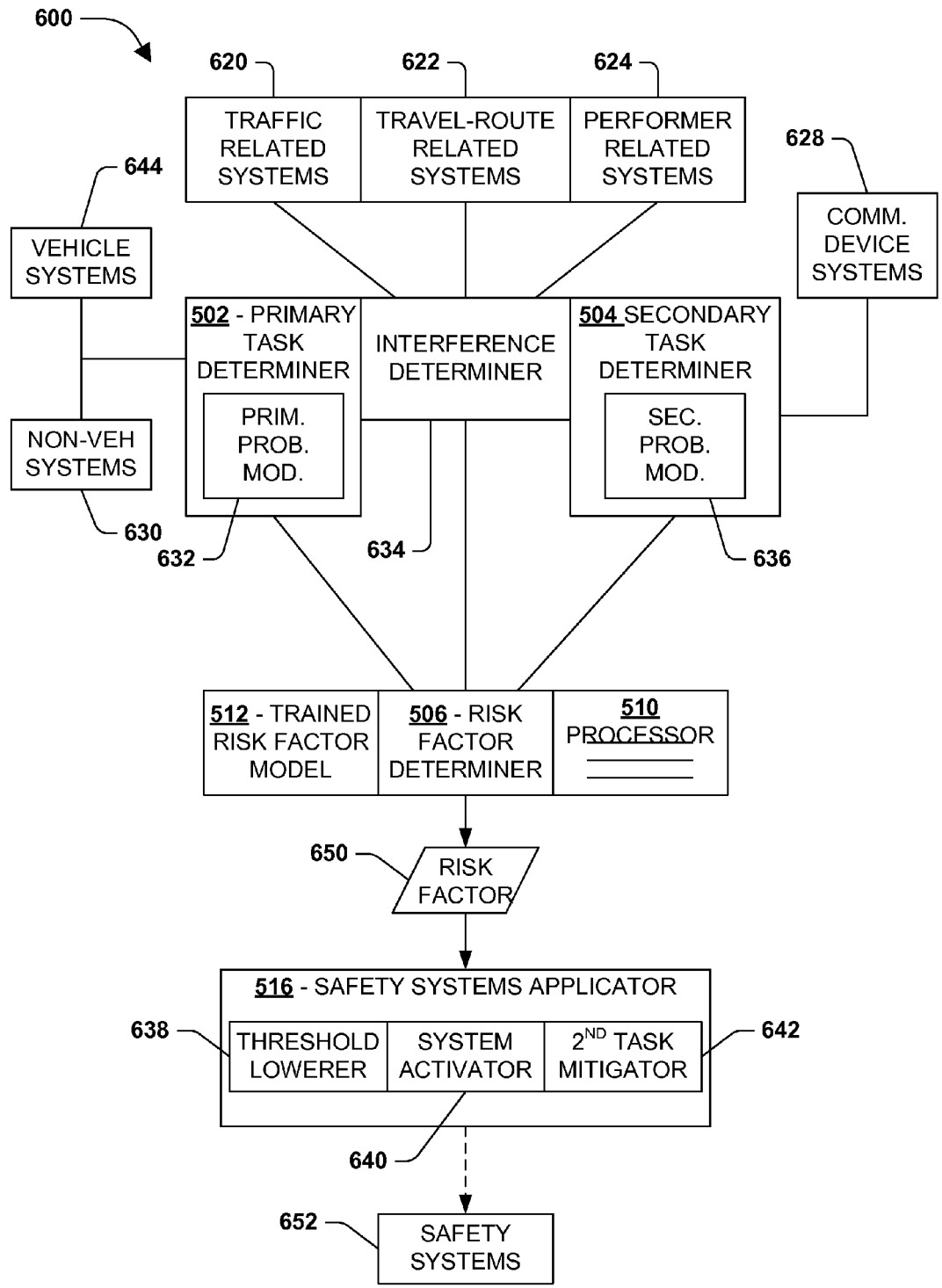
FIG. 6 is a component diagram illustrating one embodiment where one or more systems and/or techniques described herein may be implemented.

FIG. 6 is a component diagram illustrating one embodiment 600 where one or more systems and/or techniques described herein may be implemented. An interference determination component 634 determines one or more interference factors for one or more potential intervening interferences that could occur during performance of the primary and secondary tasks. Further, in this embodiment 600, the risk factor determination component 506 is configured to determine the risk factor for the potential lack of cognitive resources, such as for performing the primary task, by applying the one or more primary task related factors, the one or more secondary task related factors and the one or more interference factors to the trained risk factor model 512.

The interference determination component 634 is operably coupled with one or more traffic-related systems 620 that provide real-time traffic-related information, one or more travel-route related systems 622 that provide real-time travel-route related information, and one or more task-performer related systems 624 that provide real-time information related to a primary task performer.

The primary task determination component 502 is operably coupled with one or more vehicle systems 644 that can provide safety-related telemetry in real-time to the primary task determination component 502, and one or more non-vehicle systems 630 that can provide vehicle operation-related information in real-time to the primary task determination component 502. Further, the primary task determination component 502 comprises a primary probabilistic modeling component 632 that determines the one or more primary task factors using a primary probabilistic model from inputted safety-related telemetry and vehicle operation-related information.

The secondary task determination component 504 is operably coupled with one or more communications device related systems 628 that provide real-time communications telemetry related to the secondary task. Further, the secondary task determination component 504 comprises a secondary probabilistic modeling component 636 that determines the one or more secondary task factors using a secondary probabilistic model from inputted communications telemetry related to the secondary task.

The safety systems application component 516 comprises a threshold lowering component 638 that lowers a threshold for activating a safety related system 652 based on the risk factor. Further, the safety systems application component 516 comprises a safety-system activation component 640 that provides a signal for activating a primary task-related safety system (e.g., 652) based on the risk factor. For example, the safety-system activation component 640 may send a signal to a safety device (e.g., automatic braking system) to activate when a risk factor threshold is met. Additionally, the safety systems application component 516 comprises a secondary task mitigation component 642 that can mitigate or inhibit performance of the secondary task based upon the risk factor.

In another embodiment, the safety system may also turn on or activate external signals (e.g. a light similar to a brake light that is visible by surrounding vehicles). For example, an external light may indicate that the driver may be engaged in additional tasks while driving. In this example, this may allow other drivers to calibrate their safety maintenance accordingly. As another example, a police or parent alert may be activated, such as to send a warning signal to the police and/or parents when a particular threshold is met. As another example, an alert may be sent out (or recorded internally to the system) to a company when operators of their vehicles meet a desired threshold. It will be appreciated that these types of safety systems comprise add-ons that are voluntary "opt-ins" or may be based on some contractual arrangement, for example.

Figure 7:
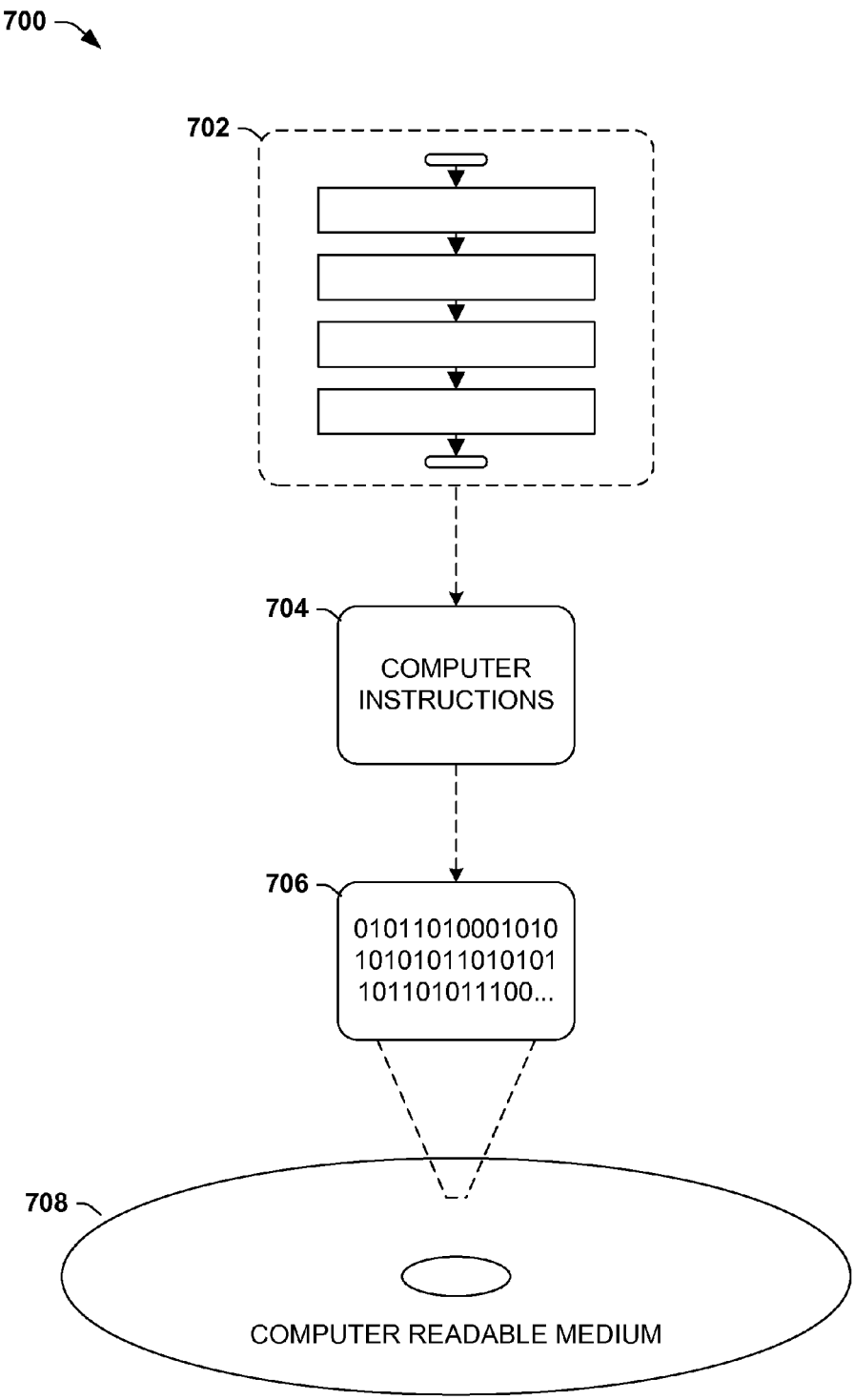
FIG. 7 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 7, wherein the implementation 700 comprises a computer-readable medium 708 (e.g., a CD-R, DVD-R, or a platter of a hard disk drive), on which is encoded computer-readable data 706. This computer-readable data 706 in turn comprises a set of computer instructions 704 configured to operate according to one or more of the principles set forth herein. In one such embodiment 702, the processor-executable instructions 704 may be configured to perform a method, such as the exemplary method 100 of FIG. 1, for example. In another such embodiment, the processor-executable instructions 704 may be configured to implement a system, such as the exemplary system 500 of FIG. 5, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 8:
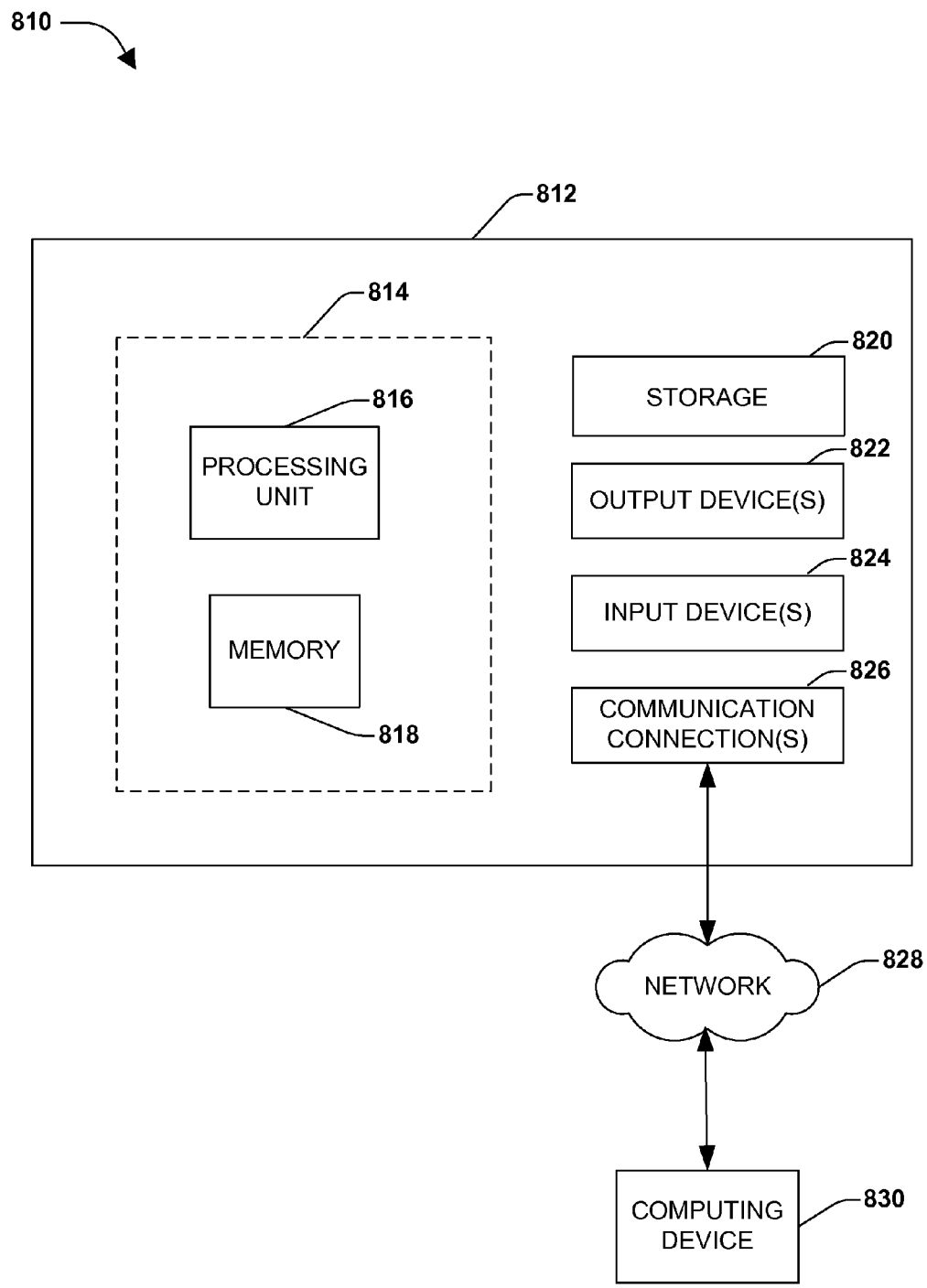
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 810 comprising a computing device 812 configured to implement one or more embodiments provided herein. In one configuration, computing device 812 includes at least one processing unit 816 and memory 818. Depending on the exact configuration and type of computing device, memory 818 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In one embodiment, computer readable instructions to implement one or more embodiments provided herein may be in storage 820. Storage 820 may also store other computer readable instructions to implement an operating system, an application program, and the like. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Any such computer storage media may be part of device 812.

Device 812 may also include communication connection(s) 826 that allows device 812 to communicate with other devices. Communication connection(s) 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection(s) 826 may include a wired connection or a wireless connection. Communication connection(s) 826 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device(s) 824 such as keyboard, mouse, pen, voice input device, touch input device, infrared cameras, video input devices, and/or any other input device. Output device(s) 822 such as one or more displays, speakers, printers, and/or any other output device may also be included in device 812. Input device(s) 824 and output device(s) 822 may be connected to device 812 via a wired connection, wireless connection, or any combination thereof. In one embodiment, an input device or an output device from another computing device may be used as input device(s) 824 or output device(s) 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computer readable instructions may be distributed across a network. For example, a computing device 830 accessible via network 828 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A computer-based method for mediating tasks in real-time for safety-related concerns, comprising:
   determining, at least in part via a processing unit, a nature of a primary task related to safety based on a complexity of the primary task, the complexity based on one or more characteristics of the primary task, the one or more characteristics of the primary task not comprising speed, the one or more characteristics of the primary task corresponding to at least one of a traffic condition or an environmental condition, the nature of the primary task indicative of cognitive resources required to perform the primary task;
   determining, at least in part via the processing unit, a nature of a secondary task, the nature of the secondary task indicative of cognitive resources required to perform the secondary task;
   determining, at least in part via the processing unit, a risk factor for a potential lack of the cognitive resources required to perform the primary task by applying the nature of the primary task and the nature of the secondary task to a trained risk factor model; and
   applying, at least in part via the processing unit, the risk factor to one or more safety-related systems in real-time.

2. The method of claim 1, comprising:
   determining a nature of a potential intervening interference; and
   determining the risk factor by applying the nature of the potential intervening interference to the trained risk factor model.

3. The method of claim 2, determining the nature of the potential intervening interference comprising determining one or more of:
   traffic-related interferences;
   route-related interferences;
   environmental related interferences; or
   primary task performer related interferences.

4. The method of claim 1, the primary task comprising vehicle operation.

5. The method of claim 4, the secondary task not comprising vehicle operation.

6. The method of claim 1, determining the nature of the primary task comprising determining a context of a vehicle operation task in real-time.

7. The method of claim 6, determining the context of the vehicle operation task comprising gathering real-time information related to vehicle conditions.

8. The method of claim 1, determining the nature of the secondary task comprising determining a context of a communications-related task in real-time.

9. The method of claim 8, determining the context of the communications-related task comprising gathering real-time information related to mobile communications.

10. The method of claim 1, at least one of determining the nature of the primary task or determining the nature of the secondary task comprising one or more of:
    gathering real-time telemetry from one or more systems associated with at least one of the primary task or the secondary task;
    gathering real-time task-related information from one or more non-task systems; or
    determining a probabilistic model for the nature of the primary task using the gathered telemetry and task-related information.

11. The method of claim 1:
    where the primary task comprises a vehicle operation task, determining the nature of the primary task comprising performing one or more of:
        gathering real-time vehicle safety-related information; or
        gathering real-time vehicle operation-related information.

12. The method of claim 1, applying the risk factor to one or more safety-related systems in real-time comprising one or more of:
    lowering a threshold for activating a safety related system;
    activating a safety related system; or
    mitigating performance of the secondary task.

13. The method of claim 1, applying the risk factor to one or more safety-related systems in real-time comprising one or more of:
    using the risk factor to automatically take control of one or more systems related to the primary task;
    using the risk factor to provide one or more alerts to one or more performers of the primary task;
    using the risk factor to activate one or more systems that mitigate performance of the secondary task; or
    using the risk factor to activate a cue indicative of multi-tasking.

14. A system for mediating tasks in real-time for safety-related concerns, comprising:
    one or more processing units; and
    memory comprising instructions that when executed by at least one of the one or more processing units, perform a method comprising:
        determining a nature of a primary task related to safety based on a complexity of the primary task, the complexity based on one or more characteristics of the primary task, the one or more characteristics of the primary task not comprising speed, the one or more characteristics of the primary task corresponding to at least one of a traffic condition, an environmental condition or a route condition, the nature of the primary task indicative of cognitive resources required to perform the primary task;
        determining a nature of a secondary task, the nature of the secondary task indicative of cognitive resources required to perform the secondary task;
        determining a risk factor for a potential lack of the cognitive resources required to perform the primary task by applying the nature of the primary task and the nature of the secondary task to a trained risk factor model; and
        applying the risk factor to one or more safety-related systems in real-time.

15. The system of claim 14, the method comprising:
    determining the risk factor by applying a nature of a potential intervening interference to the trained risk factor model.

16. The system of claim 15, the method comprising determining the nature of the potential intervening interference.

17. The system of claim 14,
    determining the nature of the primary task based on one or more of:
        real-time safety-related telemetry; or
        real-time vehicle operation-related information.

18. The system of claim 14, the method comprising:
    determining one or more primary task factors using a primary probabilistic model; and
    determining one or more secondary task factors using a secondary probabilistic model.

19. The system of claim 14, applying the risk factor to one or more safety-related systems in real-time comprising one or more of:
    lowering a threshold for activating a safety related system;
    activating a safety related system; or
    mitigating performance of the secondary task.

20. A physical computer readable medium device comprising instructions that when executed perform a method for mediating tasks in real-time for safety-related concerns, comprising:
    determining a nature of a primary task related to safety based on a complexity of the primary task, the complexity based on one or more characteristics of the primary task, the one or more characteristics of the primary task not comprising speed, the nature of the primary task indicative of cognitive resources required to perform the primary task;
    determining a nature of a secondary task, the nature of the secondary task indicative of cognitive resources required to perform the secondary task;
    determining a risk factor for a potential lack of the cognitive resources required to perform the primary task by applying the nature of the primary task and the nature of the secondary task to a trained risk factor model; and
    applying the risk factor to one or more safety-related systems in real-time.

* * * * *